June 10, 1930.        A. B. CADMAN        1,762,544
MAGNET CONSTRUCTION
Filed July 16, 1928
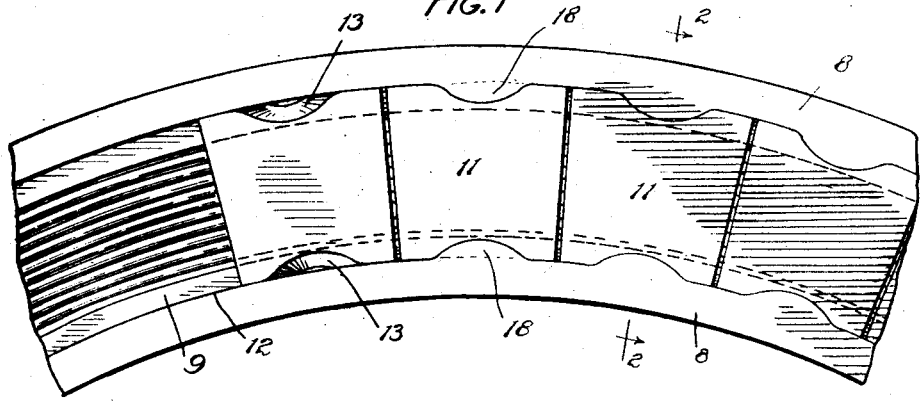
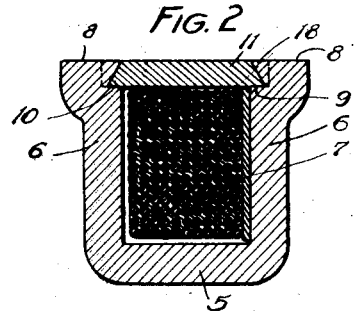
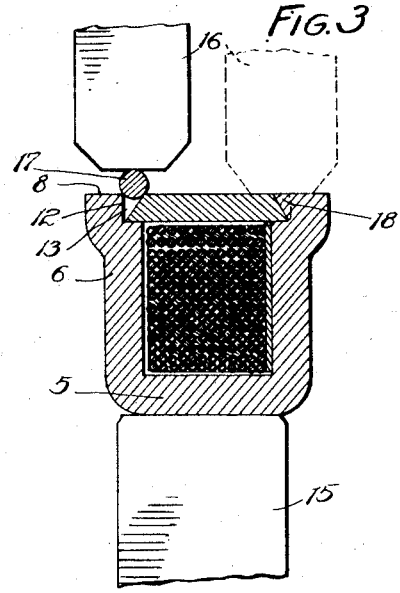
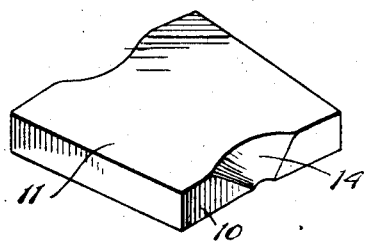
Inventor
Addi B. Cadman
By Churchill Parker & Carlson
Attys Patented June 10, 1930

1,762,544

UNITED STATES PATENT OFFICE

ADDI BENJAMIN CADMAN, OF BELOIT, WISCONSIN, ASSIGNOR TO WARNER ELECTRIC BRAKE CORPORATION, OF SOUTH BELOIT, ILLINOIS, A CORPORATION OF ILLINOIS

MAGNET CONSTRUCTION

Application filed July 16, 1928. Serial No. 293,206.

This invention relates to improvements in the construction of electromagnets and more particularly to magnets having friction surfaces.

The electromagnets commonly used in friction devices such as clutches, brakes and the like are generally formed with a winding substantially enclosed by a soft metal core defining poles whose faces are disposed in a common plane to provide the friction surface. To sustain the pressure of magnetic attraction between the pole surfaces and the magnet armature and thereby eliminate undue wear on the former, it has been found desirable to provide a wear resisting surface on the magnet core substantially flush with the pole faces. This wear surface may be formed by a plate of suitable material seated on shoulders formed on the magnet poles.

It has been proposed to secure such wear plates to the magnet poles by electric welding. In practicing this method, however, excessive heat is developed in the poles owing to the differences in electric conductivity between the poles and the wear plates which results in a melting away of the supporting shoulders of the poles, thereby rendering the magnets defective.

The present invention aims to provide a new and improved method of and means for securing a wear plate to the pole of a magnetic core or to the magnetic face of a magnet armature.

In carrying out this object a separate piece of metal is fused and allowed to flow into the space between the wear plate and the adjacent portion of the pole supporting it, the fused metal forming a key which locks the two parts against relative movement.

Other objects and advantages of the invention will become apparent from the following detailed description taken in connection with the accompanying drawings, in which—

Figure 1 is a fragmentary face view of a magnet core constructed in accordance with the present invention.

Fig. 2 is a section taken along the line 2—2 of Fig. 1.

Fig. 3 is a similar section illustrating two steps in the welding process.

Fig. 4 is a perspective view of one of the wear plates.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

The invention is illustrated in the drawings in connection with the formation of a magnet of the ring type which has an annular core 5 of narrow radial width and preferably composed of soft permeable iron. In radial cross section the core is substantially U-shaped having parallel flanges 6 which define an annular groove around the core in which is disposed a winding 7 of any preferred number of turns.

The flanges 6 constitute magnetic poles providing concentric faces 8 of narrow radial width disposed substantially in a common plane for attracting the flat surface of an armature (not shown). Thus the core and the armature constitute a substantially closed metallic path enclosing the winding 7, around which path a flux threads upon energization of the winding.

Around the outer edge of the inner pole 6 and the inner edge of the outer pole are formed annular shoulders 9 which provide a backing for supporting the inner and outer side edges 10 of a plurality of short wear plates 11, the sides 12 of the poles, forming an annular groove of substantially greater radial width than the groove in which the winding 7 is mounted. The plates are received in this groove and are of such thickness as to provide a friction surface substantially flush with the pole faces 8. Preferably, the wear plates are made of high manganese steel, that is steel containing 10 to 14 per cent of manganese, such steel being extremely resistant to the frictional wear and non-magnetic but of low electric conductivity. The latter feature renders it difficult to form a satisfactory weld between the plates 11 and the shoulders 9 without danger of fusing away part of the shoulder before the plate has been raised to a welding heat.

In practicing the present invention, a notch is formed between the magnet pole and the edge of the wear plate to which it is to be secured. This may be accomplished by forming the wear plates with substantially straight side edges 10 but it is preferred to form a deeper notch 13 which can be accomplished by grinding the edge of the wear plate as indicated at 14, Fig. 4. During welding the magnet is supported in horizontal position as shown in Fig. 3 with its back resting upon an electrode 15 of relatively large area, the other electrode 16 of the spot welding machine being disposed above the notch 13 and adapted for downward movement. A piece of metal 17, such as iron wire, is placed over the notch 13 and beneath the electrode 16 as shown in Fig. 3. When the electrode is lowered against the wire the circuit of the welding machine is completed which causes the wire to fuse quickly and flow into the notch 13, completely filling the same to form a key 18, as indicated in Fig. 2. The electrode 16 is lowered further into the position shown in dotted outline in Fig. 3 where it is held only momentarily to raise the engaged portion of the pole 6 to a welding heat, the fused metal becoming welded to the surface 12 of the pole. Since the key thus formed projects into the notch portion of the wear plate, the latter is securely held against movement longitudinally of the groove formed in the core.

In some instances, the contact of the electrode 16 with the edge of the manganese steel wear plate will heat the latter to a temperature sufficient to cause the key 18 to be welded thereto. Usually, however, this is not the case. If desired, both edges of the wear plate may be welded to the respective magnetic poles. After all of the plates have been welded in position, the excess metal, resulting from the formation of the keys 18 and forced out of the recesses 13 in the movement of the electrode 16 against the face of the magnet, is removed as by grinding so as to leave a perfectly flat friction surface formed by the pole faces 8, the keys 18 and the outer surfaces of the wear plates as shown in Fig. 2.

It will be apparent that I have provided an effectual method of securing wear plates to the magnetic core by electric welding without danger of rendering the magnet defective. This method, because of its simplicity, greatly reduces the cost of constructing the magnet. When thus mounted in the core, the wear plates are free to expand under the heat of friction without having a tendency to cause warping of the friction surface.

I claim as my invention:

1. A magnet comprising, in combination, an annular core having concentric inner and outer poles enclosing an annular winding, shoulders formed at the outer edge of the inner pole and at the inner edge of the outer pole, a wear plate of high manganese steel having its opposite side edges seated on said shoulders, there being a notch formed in one side edge of said plate, and a key of a separate piece of metal projecting into said notch and welded to the adjacent portion of one of said poles.

2. A magnet comprising, in combination, a core having opposed elongated poles defining a groove in which is disposed a winding, shoulders formed on said poles, a wear plate supported on said shoulders and providing a friction surface substantially flush with the pole faces, there being a notch formed in one side edge of said plate and a key formed from a separate piece of metal integral with the portion of one of said poles adjacent said notch, said key projecting into said notch and engaging the sides thereof to prevent movement of said plate longitudinally of said groove.

3. In a magnet, the combination of a pole having a flat face and a backing shoulder along one edge thereof, a wear plate supported upon said shoulder and providing a surface substantially flush with said face, one side edge of said plate and the adjacent portion of said pole being shaped to form a recess, and a key formed in said recess from a separate piece of metal and securing said wear plate against movement relative to said pole.

4. In the formation of an annular magnet having a core with spaced concentric poles and a non-magnetic wear plate seated on said core against shoulders formed on said poles, the method of securing said wear plate against movement longitudinally of said core which consists in placing a separate piece of metal on said core at the junction of said plate and one of said poles, moving an electrode into contact with said piece of metal to fuse the same and into contact with said core to form a weld between said pole and said fused metal.

5. In the formation of an electromagnet having a pole with an elongated shoulder along one edge thereof for supporting a wear plate substantially flush with the face of said pole, the method of securing said plate against movement longitudinally of said pole which consists of shaping one edge of said wear plate and the adjacent portion of said pole face to form a recess, passing an electric current through said pole and a separate piece of metal contacting said pole adjacent said notch whereby to fuse said metal into the notch and thereby locking said plate and said pole together.

6. In the formation of an electromagnet having a pole with an elongated shoulder along one edge thereof for supporting a wear plate substantially flush with the face of said pole, the method of securing said plate against movement longitudinally of said pole which consists of shaping one edge of said wear plate and the adjacent portion of said pole face to form a recess, and fusing a separate piece of metal into said notch to form a key which locks said plate and pole together.

7. In the formation of an electromagnet having a pole with an elongated shoulder along one edge thereof for supporting a wear plate substantially flush with the face of said pole, the method of securing said plate against movement longitudinally of said pole which consists of forming a notch in said plate which cooperates with said pole to form an outwardly opening recess, supporting said core in contact with a welding electrode with said recess opening upwardly, placing a piece of metal between said recess and another electrode opposite said recess, bringing said other electrode into contact with said piece of metal to fuse the same into said recess, and continuing the movement of said electrode until it engages said pole whereby to produce a weld between the fused metal and the adjacent portion of said pole.

8. In the formation of an electromagnet having a pole with an elongated shoulder along one edge thereof for supporting a wear plate substantially flush with the face of said pole, the method of securing said plate against movement longitudinally of said pole which consists of forming a notch in said plate which cooperates with said pole to form an outwardly opening recess, and fusing a piece of metal into said recess.

9. In the formation of an electromagnet having a pole with an elongated shoulder along one edge thereof for supporting a wear plate substantially flush with the face of said pole, the method of securing said plate against movement longitudinally of said pole which consists of forming a notch in said plate which cooperates with said pole to form an outwardly opening recess, supporting said core in contact with a welding electrode, placing a piece of metal between another electrode and said recess, and bringing said last mentioned electrode and said piece of metal momentarily into contact whereby to fuse said metal and cause welding thereof to said core.

10. In the formation of an electromagnet having a pole with an elongated shoulder along one edge thereof for supporting a wear plate substantially flush with the face of said pole, the method of securing said plate against movement longitudinally of said pole which consists of forming a notch in one edge of said wear plate opposite one of said poles, placing a separate piece of metal on said core opposite said notch, passing an electric current through said core and said piece of metal whereby to fuse the latter into said notch to form a key, and heating said pole sufficiently to produce a weld between said key and said pole.

11. In the formation of an electromagnet having a pole with an elongated shoulder along one edge thereof for supporting a wear plate substantially flush with the face of said pole, the method of securing said plate against movement longitudinally of said pole which consists of forming a notch in one edge of said wear plate opposite one of said poles, and welding a separate piece of metal to said pole to form a key projecting into said notch.

12. A magnetic element comprising, in combination, a member of magnetic material providing two opposed elongated faces defining a groove between them, a wear plate disposed between said faces and providing a friction surface substantially flush with said faces there being a notch formed in one side edge of said plate, and a key formed from a separate piece of metal integral with one of said faces and projecting into said notch so as to engage the sides thereof to prevent movement of said plate longitudinally of said groove.

13. In the formation of a magnetic element having a magnetic face with an elongated shoulder along one edge thereof for supporting a wear plate substantially flush with said face, the method of securing said wear plate against movement longitudinally of said face which consists in forming a notch in one side edge of said wear plate, placing a separate piece of metal at the junction of said face and said notch, passing an electric current through the magnetic element and said piece of metal whereby to fuse the latter into said notch to form a key, and heating said face sufficiently to produce a weld between said key and said face.

14. In the formation of a magnetic element having a magnetic face with an elongated shoulder along one edge thereof for supporting a wear plate substantially flush with said face, the method of securing said plate against movement longitudinally of said face which consists in forming a notch in one side edge of said plate and welding a separate piece of metal to said face to form a key projecting into said notch.

In testimony whereof, I have hereunto affixed my signature.

ADDI BENJAMIN CADMAN.